United States Patent
Yoshinaga et al.

(10) Patent No.: US 11,163,267 B2
(45) Date of Patent: Nov. 2, 2021

(54) EVENT-BASED TIME ZONE CHANGES

(71) Applicant: International Business Machines Corporation, Armonk, NY (US)

(72) Inventors: Hiroki Yoshinaga, Tokyo (JP); Kousei Kawamura, Tokyo (JP); Hiroki Yoshihara, Tokyo (JP); Yukimasa Kizawa, Funabashi (JP)

(73) Assignee: International Business Machines Corporation, Armonk, NY (US)

(*) Notice: Subject to any disclaimer, the term of this patent is extended or adjusted under 35 U.S.C. 154(b) by 395 days.

(21) Appl. No.: 16/364,293

(22) Filed: Mar. 26, 2019

(65) Prior Publication Data

US 2020/0310361 A1 Oct. 1, 2020

(51) Int. Cl.
*G06F 9/54* (2006.01)
*G04G 9/00* (2006.01)
*H04W 64/00* (2009.01)

(52) U.S. Cl.
CPC ........... *G04G 9/0076* (2013.01); *G06F 9/542* (2013.01); *H04W 64/003* (2013.01)

(58) Field of Classification Search
CPC ..... G06F 9/4812; G06F 9/542; G04G 9/0076; H04W 4/02; H04W 4/22; H04W 64/00; H04W 88/02
USPC .............. 719/318; 368/21; 455/404.2, 422.1, 455/456.1, 457
See application file for complete search history.

(56) References Cited

U.S. PATENT DOCUMENTS

| 6,198,696 B1 | 3/2001 | Korpi et al. |
| 6,711,617 B1 | 3/2004 | Bantz et al. |
| 7,443,767 B2 * | 10/2008 | Mohler .................. G04G 11/00 368/21 |
| 8,965,353 B2 | 2/2015 | Bruins et al. |
| 9,760,869 B2 * | 9/2017 | Von Hessberg ... G06Q 10/1093 |
| 10,096,002 B2 * | 10/2018 | Barraci ................ G04G 9/0076 |
| 10,860,633 B2 * | 12/2020 | Rogynskyy ............... G06F 7/14 |
| 2013/0227462 A1 | 8/2013 | Hsu |

FOREIGN PATENT DOCUMENTS

JP 2014211430 A 11/2014

* cited by examiner

*Primary Examiner* — Andy Ho
(74) *Attorney, Agent, or Firm* — Timothy J. Singleton (57) ABSTRACT

Embodiments of the present disclosure describe automatically changing a time zone of a mobile device to a current time zone. The method detects a first event for a mobile device from a plurality of events. The plurality of events represents a possible time zone change from a first time zone. The method generates a time change value based on detection of the event. The method detects a subsequent event for the mobile device and modifies the time change value. The method determines the time change value exceeds a change threshold value and changes a time zone display of the mobile device from the first time zone to a second time zone based on at least one detected event for the mobile device.

20 Claims, 5 Drawing Sheets

EVENT-BASED TIME ZONE CHANGES

BACKGROUND

Mobile computing devices such as smartphones and tablets display time information to users while connected to a communications network. While the mobile computing devices are connected to the communications network, the time information may be updated to reflect changes in time zones and seasonal time changes. Users of mobile computing devices often travel through areas of low or no connectivity to communications networks. Similarly, some methods of travel preclude interaction with a communications network during travel time, such as while a mobile computing device is used during a flight.

SUMMARY

According to an embodiment described herein, a computer-implemented method for automated time zone changes for mobile devices. The automated time zone changes may be event-based, such that detected events trigger automated time zone changes. The time zones of a mobile device may be changed by detecting a first event for the mobile device from a plurality of events. The plurality of events represents a possible time zone change from a first time zone. The method generates a time change value based on detection of the event. The method detects a subsequent event for the mobile device. The subsequent event being an event of the plurality of events. The method may then modify the time change value based on detection of the subsequent event. The method may then determine the time change value exceeds a change threshold value and change a time zone display of the mobile device. The time zone display may be changed from a first time zone to a second time zone based on at least one detected event for the mobile device.

In some embodiments, the first event and the subsequent event occur in the first time zone. In such embodiments, the method detects a first location and a first time for the first event. The time change value may be generated based on the first event, the first location, and the first time. The method detects a subsequent location and a subsequent time for the subsequent event. The time change value is modified based on the subsequent event, the subsequent location, and the subsequent time. The method then determines the first location and the subsequent location are proximate to a landmark associated with at least one event of the plurality of events.

In some embodiments, the method determines an elapsed time between the first event and the subsequent event. The method then modifies the time change value based on the elapsed time.

In some embodiments, the method displays the first time zone within an event window of a user interface displayed on the mobile device. The method may then display the second time zone within the event window of the user interface displayed on the mobile device. The display of the second time zone may be based on the time change value exceeding the change threshold value. The second time zone may be displayed proximate to the first time zone.

In some embodiments, the subsequent event is a plurality of subsequent events detected by the method. The method detects each subsequent event of the plurality of subsequent events at a distinct time. The time change value may be modified based on detection of each subsequent event of the plurality of subsequent events. Based on detection of each subsequent event and modification of the time change value, a depiction of the first time zone and the second time zone may be iteratively modified. The iterative modification may be presented within the event window.

In some embodiments, the method determines at least one event of the first event and the subsequent event is a departure from the first time zone. The method displays the first time zone and a departure countdown. The departure countdown may represent a remaining time until departure from the first time zone.

In some embodiments, changing the time zone display of the mobile device is performed using one or more sub-operations. The method determines an arrival countdown. The arrival countdown represents a time remaining until arrival at a location within the second time zone. The method displays the arrival countdown within the time zone display of the mobile device.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

The present disclosure relates generally to a method for managing time zone changes on computing devices, and more specifically, but not exclusively, to a computer-implemented method for automated event-based time zone changes for mobile computing devices. The present disclosure relates further to a related system for automated event-based time zone changes, and a computer program product.

When users travel, such as by airplane, flight information may be presented according to time zone of the arrival point. However, time zone settings of mobile computing devices, such as smartphones, remain the same as the departure point. While the time zone settings may be changed manually, it may be unclear through or into what time zone the user is traveling. Similarly, although time zone settings may be changed by connecting to a communications network, the mobile computing device may be unable to connect to a sufficient communications network until after the termination of the travel. This makes it difficult for the user to know the local time accurately.

When a user travels by air, time zone settings for mobile devices are not changed smoothly. Before arrival at a destination, flight information may present an arrival time in a time zone associated with the destination. However, the mobile computing device continues displaying time information according to a time zone of the departure point. The time zone settings are not changed automatically until the mobile computing device lands or otherwise arrives at the destination.

Time zone information may be provided via a mobile network (e.g., 3G, 4G, LTE). Where the mobile computing device remains in flight, the mobile computing device may be precluded from connecting to the mobile network. Further, establishing a connection via a communication access point on an airplane often fails to update or change time zone settings. Position information may not be used in flight as mobile computing devices within an airplane are precluded from receiving global positioning system (GPS) data, thus increasing difficulties in determining a current position of the mobile computing device.

Embodiments of the present disclosure provide a technical solution for automated or event-based time zones of mobile computing devices, while the mobile computing devices are in transit. Further, embodiments of the present disclosure enable such automated time zone changes without connection to a network connection during travel. Embodiments of the present disclosure may receive flight information, identify current time zones, identify destination time zones, and determine boarding or embarkation times. Using such information, embodiments of the present disclosure enable automated changes of time zone settings while in travel. Time zone changes may be optimized for timing and user convenience. Embodiments of the present disclosure enable determination of events relevant to boarding or embarkation of the user, determination of a likelihood of travel, and changing of time zone settings prior to arrival at a destination. Some embodiments of the present disclosure incorporate passage through connecting or transit stations or airports. Further, embodiments of the present disclosure enable notification of automated time zone setting changes. Embodiments of the present disclosure enable switching between time zones in a departure location and a destination according to calculated likelihood values.

Figure 1:
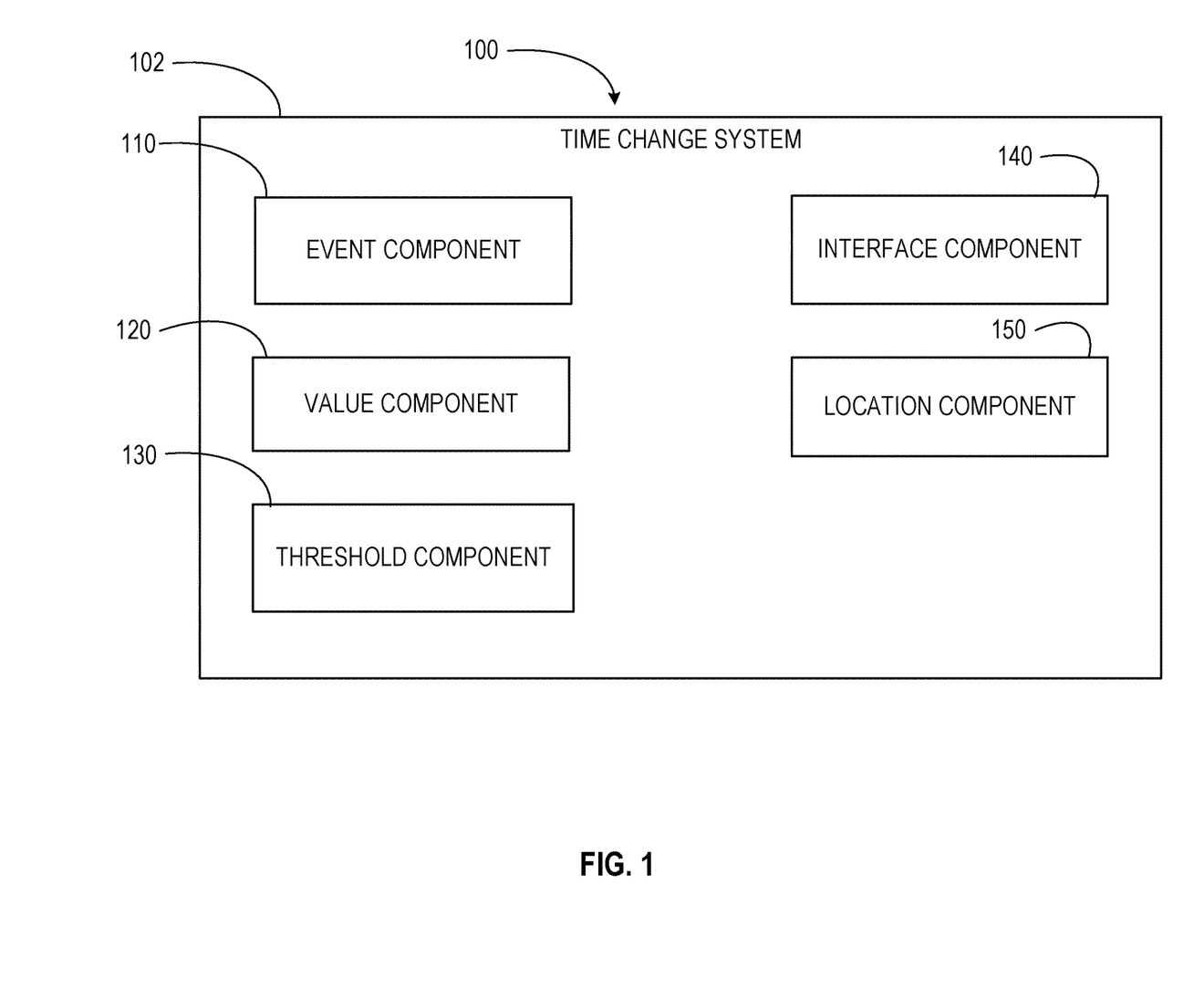
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a time change system 102. The time change system 102 may comprise an event component 110, a value component 120, a threshold component 130, an interface component 140, and a location component 150. The event component 110 may detect events for a mobile device representing possible time zone changes. The value component 120 may generates and modifies time change values. The threshold component 130 may determine generated or modified time change values exceed a change threshold value. The interface component 140 may generate, display, or change time zone displays of the mobile device from a first time zone to a second time zone based on at least one detected event for the mobile device. The location component 150 may determine locations associated with events detected by the event component 110.

Figure 2:
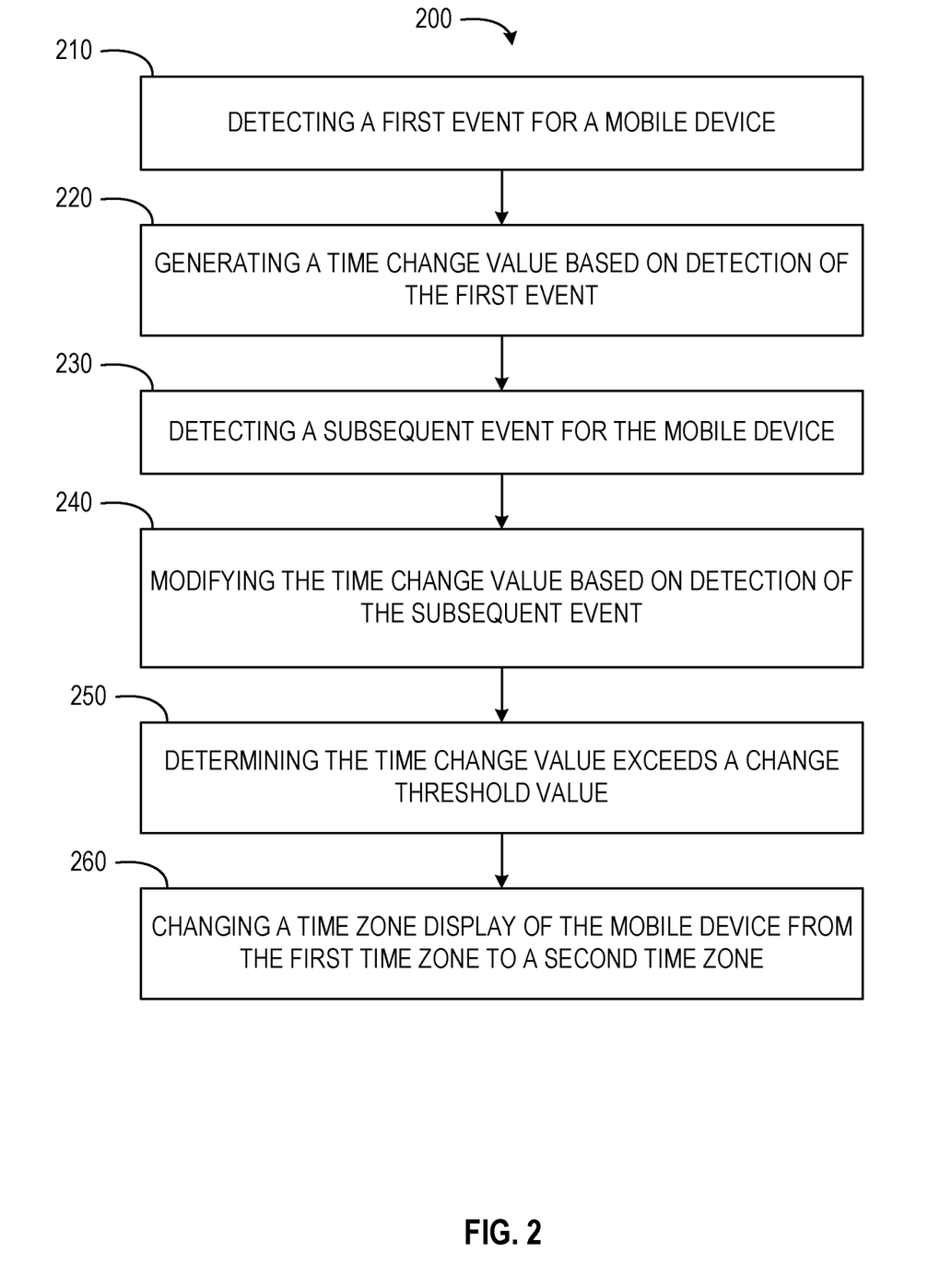
FIG. 2 depicts a block diagram of a computer-implemented method for automated time zone changes for mobile computing devices, according to at least one embodiment.

Referring now to FIG. 2, a block diagram of a computer-implemented method 200 is shown. The computer-implemented method 200 is a method for automated time zone changes for mobile computing devices. In some embodiments, the computer-implemented method 200 may be performed by one or more components of the computing environment 100, as described in more detail below.

At operation 210, the event component 110 detects a first event for a mobile device. The plurality of events represents a possible time zone change from a first time zone. The first event may occur in a first time zone. In some embodiments, when detecting the first event, the event component 110 detects a first location and a first time for the first event. The plurality of events may include arrival at an airport or other travel embarkation location, arrival at a specified position within the embarkation location (e.g., arrival at an airline counter, arrival at an airport boarding gate, arrival at an airport), waiting at a boarding location, waiting within a travel location, arrival at a parking terminal near an embarkation location, arrival in a vehicle (e.g., arrival in an airplane or a bus), departure from a travel location, departure in a vehicle (e.g., departure in an airplane or bus), checking in at a travel location, checking in with an airline, accessing travel documents, accessing travel tickets, detection of two or more mobile devices on a same flight or checking into a same flight, scanning a boarding pass, initiation of a limited communication mode (e.g., airplane mode), and motion indicating starting or ending travel (e.g., a motion sensor, gyroscope, or acceleration sensor identifying motion suggesting travel in a vehicle), combinations thereof, or any other suitable event. Although described with respect to specific examples, it should be understood that the plurality of events may include any suitable actions, events, locations, and combinations thereof which indicate a likelihood or possibility of a time zone change from a first time zone and location to a second time zone and location.

The event component 110 may detect the first event using one or more sensors of the mobile device. In some embodiments, the event component 110 detects events using one or more of a power management sensor, a near field communication sensor, an optical sensor (e.g., a camera or QR sensor), a GPS signal, a position sensor, an attitude sensor, an acceleration sensor, a gyroscope, one or more communication components (e.g., a transceiver sending or receiving ticket information, flight information, or contacting or collecting airline information), combinations thereof, or any other suitable sensor.

At operation 220, the value component 120 generates a time change value based on detection of the event. The time change value may represent a likelihood that the mobile device will change time zones. In some embodiments, each event of the plurality of events is assigned a point value. The point value may be positive or negative. Positive point values may indicate an increased likelihood of changing time zones. Negative point values may indicate a decreased likelihood of changing time zones. The value component 120 may identify the first event and a point value associated with the first event. The value component 120 may generate the time change value at least in part based on the point value of the first event. In some embodiments, the value component 120 applies a heuristic weighting scheme. The heuristic weighting scheme may modify point values of specified events, such that when an event of the plurality of events is determined as a first event within a series or set of events, the point value of the first event is increased.

In some embodiments, the time change value may be generated, at least in part, based on the first event, the first location, and the first time. The value component 120 may take time into consideration when generating the time change value. In some instances, the value component 120 applies a weight to the point value of the first event based on a duration of time the mobile device is located at the first location of the first event. For example, the value component 120 may progressively increase a weight applied based on an elapsed time between the first time at which the mobile device arrives at the first location and triggers the first event, and a second time at which the mobile device moves from the first location. The weight or multiplier applied to the point value may be understood as a coefficient, modifying, at least periodically, the point value.

At operation 230, the event component 110 detects a subsequent event for the mobile device. The subsequent event may be an event of the plurality of events. The subsequent event may occur in the first time zone. For example, as noted above, where the first event is an arrival at an airport at a first time and a first location, the subsequent event may be using the mobile device to check in at an airline counter. The subsequent event may be detected in a manner similar to or the same as the first event, discussed above with respect to operation 210.

In some embodiments, when detecting the subsequent event, the event component 110 detects a subsequent location and a subsequent time for the subsequent event. The location component 150 may determine the first location and the subsequent location are proximate to a landmark (e.g., an airport or locations within an airport) associated with at least one event of the plurality of events. In some embodiments, the event component 110 may detect the subsequent location as a location associated with the first location. For example, where the first location is an airport, the subsequent location may be a check-in counter or a boarding gate within the airport. The event component 110 may use one or more sensors within the mobile device to detect the subsequent location. For example, the event component 110 may use a GPS location of the mobile computing device and a WIFI signal to specifically identify the subsequent location.

In some embodiments, the event component 110 determines an elapsed time between the first event and the subsequent event. The subsequent time may be identified as a time following the first time. The subsequent time may be identified within a specified time threshold. For example, where the subsequent event is detected at a subsequent time and an elapsed time between the subsequent time and the first time is greater than a time threshold, the subsequent event may be disqualified. By way of further example, where the subsequent event (e.g., arrival at a boarding gate) occurs a day after the first event of arriving at an airport, the subsequent event may be disregarded. Where the elapsed time between the first event and the subsequent event is below the time threshold, the subsequent event may be logged in a session with the first event.

At operation 240, the value component 120 modifies the time change value based on detection of the subsequent event. The time change value may be modified based on the subsequent event, the subsequent location, and the subsequent time. In some embodiments, the value component 120 combines the point value, and any applicable modifier, with a point value for the subsequent event, and any applicable modifier, to modify or change the time change value. The modified time change value may represent an increased or decreased likelihood of the mobile device changing time zones based on incorporation of the point value for the subsequent event. The value component 120 may modify or recalculate the time change value in a manner similar to or the same as described above with respect to operation 220 while incorporating point values for one or more subsequent events. In some instances, each time the event component 110 detects a new subsequent event, the value component 120 iterates, modifies, or recalculates the time change value.

The value component 120 may modify the time change value based on an elapsed time determined to extend between the first event and the subsequent event. In some embodiments, an elapsed time between the first event and the subsequent event may indicate waiting at a travel location. For example, where the first event represents arrival at an airport and the subsequent event represents passing through a boarding gate, an elapsed time between the first event and the subsequent event may indicate a wait at the boarding gate prior to boarding an aircraft. For example, a longer wait may indicate higher likelihood of taking a flight or a longer or international flight, a shorter wait may suggest a shorter flight. Such a wait may be understood as a coefficient. The coefficient is assigned a point value based on a duration of the elapsed time and the point value of the coefficient is applied to the time change value or the modified time change value to increase or decrease an estimation of the likelihood that the mobile device will change time zones.

At operation 250, the threshold component 130 determines the time change value exceeds a change threshold value. In some embodiments, the time change threshold is a value corresponding to a boundary at which determination of changing the time zone setting should be made. The change threshold value may be a static value past which a sufficient confidence of the likelihood of a time zone change is established. In some instances, the change threshold value is a dynamic value. In such instances, the change threshold value may be generated or determined based on one or more of a type, a time, a location, and a weight of the first event and any subsequent events. The threshold component 130 may determine the time change value exceeds the change threshold value by comparing the values to identify whether the time change value is equal to or greater than the change threshold value.

At operation 260, the interface component 140 changes a time zone display of the mobile device from the first time zone to a second time zone. In some embodiments, the interface component 140 changes the time zone display based on at least one detected event for the mobile device. The time zone display may be changed by modifying a time zone setting within settings of the mobile device. Changing the time zone setting may change one or more values on a clock face presented within a user interface on the mobile device. In some embodiments, the interface component 140 generates a notification of the time zone change. The notification of the time zone change may, at least temporarily, be presented on the user interface of the mobile device. In some instances, the notification is presented along with the time and clock face having the time adjusted by the change in time zone setting.

In some embodiments, the interface component 140 displays a first time zone within an event window of a user interface displayed on the mobile device. The first time zone may represent a time zone in which at least the first event occurred. The interface component 140 may also display the second time zone within the event window of the user interface displayed on the mobile device. In some embodiments, display of the second time zone is performed based on the time change value exceeding the change threshold value. The second time zone may be displayed proximate to the first time zone. The second time zone may represent a time zone for a destination determined for the mobile device.

Figure 3:
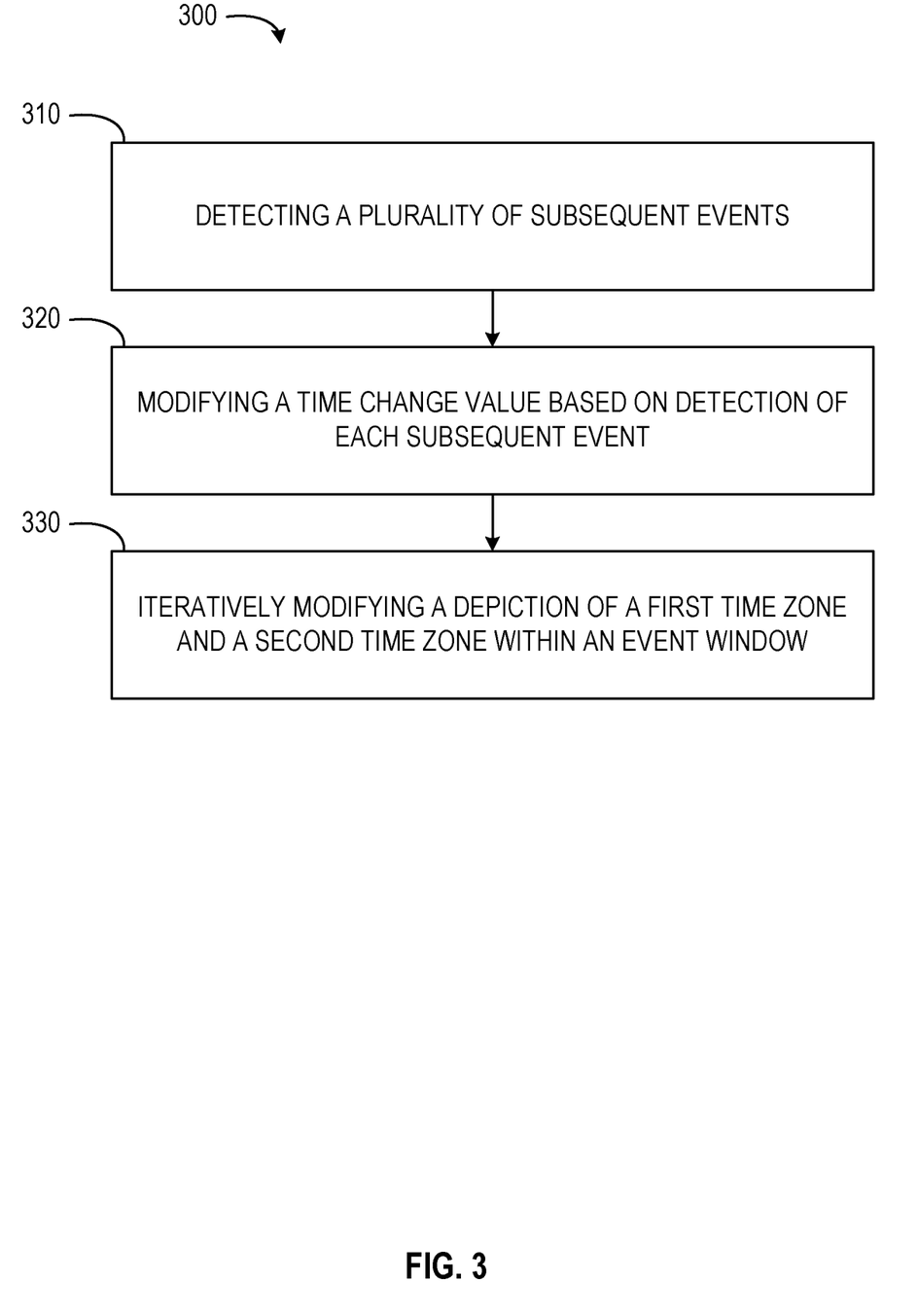
FIG. 3 depicts a block diagram of a computer-implemented method for automated time zone changes for mobile computing devices, according to at least one embodiment

FIG. 3 shows a block diagram of an embodiment of a computer-implemented method 300 for automated time zone changes for mobile computing devices. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the event component 110 detects a plurality of subsequent events. The event component 110 detects each subsequent event at a distinct time. Each subsequent event may be detected in a manner similar to or the same as described above with respect to operation 210 or 230. Each subsequent event may be logged. In some embodiments, the event component 110 disregards duplicate subsequent events. For example, where a first subsequent event represents arriving at a boarding gate and a second subsequent event represents arriving at the same boarding gate at a later time, the event component 110 may disregard the second subsequent event. By way of further example, where the event component 110 determines an intervening distance traveled between the first and second subsequent events is below a threshold (e.g., walking around) or indicates a temporary diversion (e.g., visiting an airport restaurant and returning to a boarding gate), the event component 110 may disregard the subsequent event.

In operation 320, the value component 120 modifies the time change value based on detection of each subsequent event of the plurality of subsequent events. In some embodiments, the time change value is modified in a manner similar to or the same as described above with respect to operations 220 and 240. The value component 120 may modify the time change value iteratively, with each subsequent event detected. The value component 120 may also modify the time change value periodically. For example, the value component 120 may modify the time change value in batches, based on detecting more than one similar subsequent events. The value component 120 may also modify the time change value based on elapsed times extending between each logged subsequent event.

In operation 330, the interface component 140 iteratively modifies a depiction of the first time zone and the second time zone within an event window. In some embodiments, iterative modification of the depiction is based on detection of each subsequent event and modification of the time change value. The iterative modification may gradually increase a font or display size of the second time zone while decreasing a font or display size of the first time zone. For example, the interface component 140 may iteratively modify the depiction of the time zones with each subsequent event logged. The interface component 140 may also iteratively modify the depiction of the time zones based on an anticipated departure time or anticipated arrival time in the second time zone.

Figure 4:
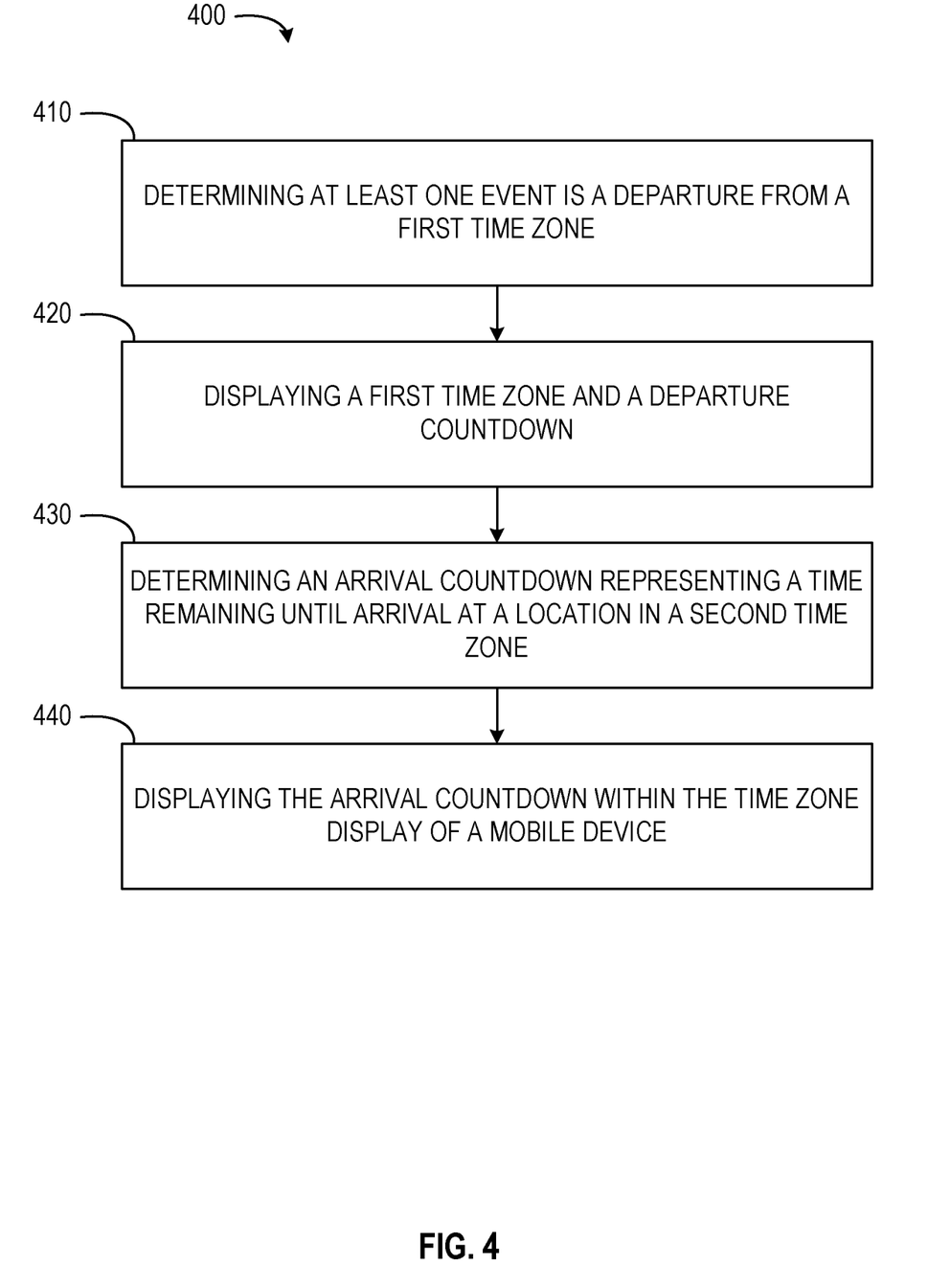
FIG. 4 depicts a block diagram of a computer-implemented method for automated time zone changes for mobile computing devices, according to at least one embodiment.

FIG. 4 shows a block diagram of an embodiment of a computer-implemented method 400 for automated time zone changes for mobile computing devices. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the event component 110 determines at least one event is a departure from a first time zone. The event component 110 may determine the departure based on input from one or more sensors of the mobile device. Where the mobile device contains an accelerometer and a gyroscope, the event component 110 may determine the departure based on an increase or change in velocity and direction of the mobile device, and the change exceeds a velocity threshold. In some embodiments, the event component 110 determines the departure based on a check in event, a registered departure event (e.g., a departure associated with a scheduled flight), or any other suitable event representative of a departure from the first time zone. In some embodiments, operation 410 is performed as part of an operation or as a sub-operation of the method 200. In such embodiments, the event component 110 may determine the departure event is at least one of the first event and the subsequent event.

In operation 420, the interface component 140 displays a first time zone and a departure countdown. The departure countdown may represent a remaining time until departure from the first time zone. Where the departure event represents a scheduled departure associated with a flight, the departure countdown may indicate a time until the flight departs. In some embodiments, the departure countdown represents a time at which the mobile device exits the first time zone. In such instances, the first time zone is displayed until the departure countdown elapses. Once the departure countdown elapses, the second time zone may be displayed.

In operation 430, value component 120 determines an arrival countdown representing a time remaining until arrival at a location within the second time zone. The location may be an arrival location associated with the departure determined in operation 410. In some embodiments, the arrival countdown may be calculated based on input from one or more sensors within the mobile device. The value component 120 may determine the arrival countdown based on an accelerometer, a gyroscope, a speed calculated prior to termination of a network connection, or any other suitable sensor information. In some embodiments, the value component 120 determines the arrival countdown based on an expected arrival time associated with a flight registered with the mobile device.

In operation 440, the interface component 140 displays the arrival countdown within the time zone display of the mobile device. The arrival countdown may be displayed proximate to a clock face displaying a time at the second time zone. The arrival countdown may also be displayed along with a clock face displaying a time at the first time zone. In some instances, display of the arrival countdown are iteratively modified, such that a size, location, or other characteristic of the arrival countdown are modified or changed responsive to the arrival countdown decreasing or elapsing.

Figure 5:
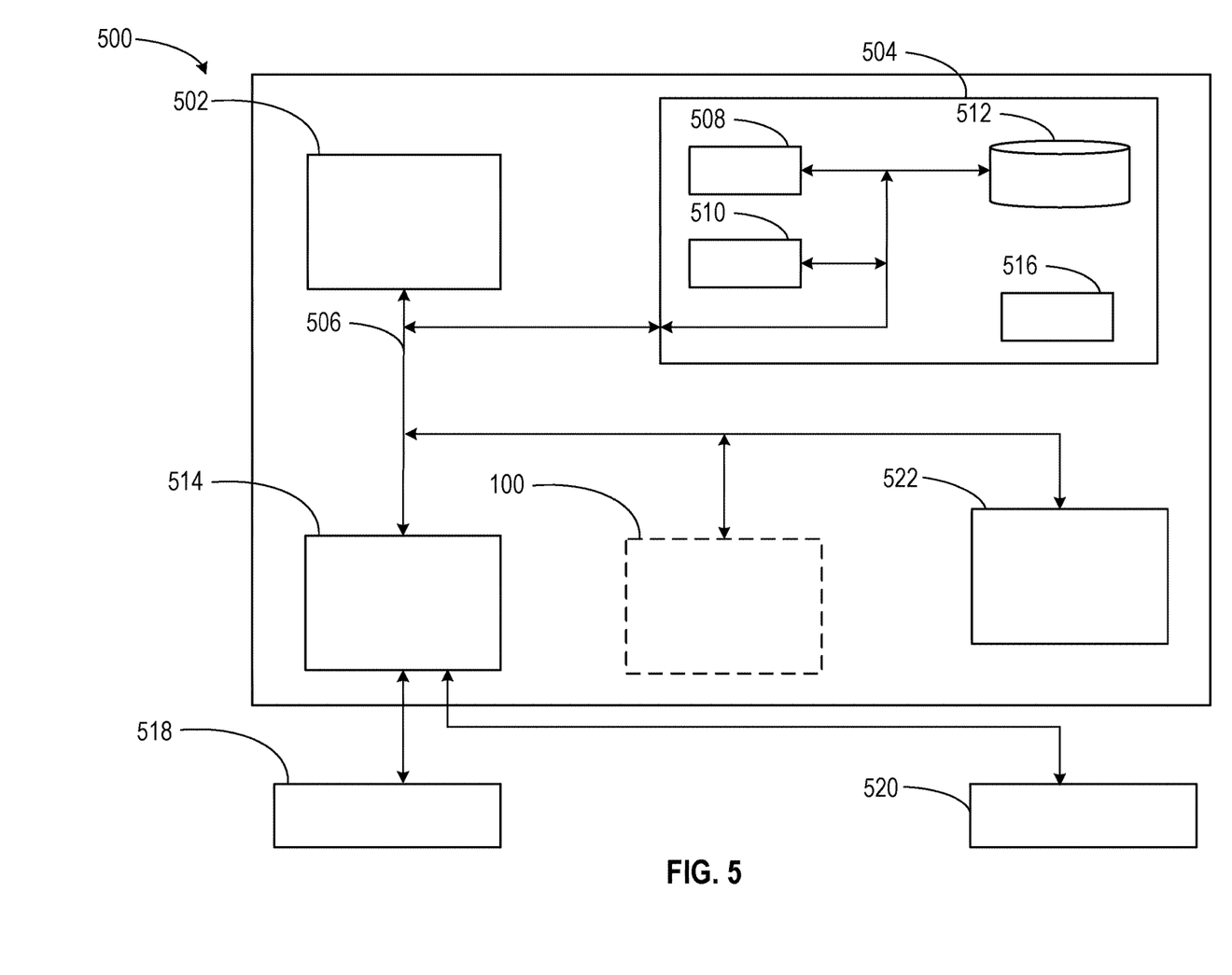
FIG. 5 depicts a block diagram of a computing system for automated time zone changes for mobile computing devices, according to at least one embodiment.

Embodiments of the present disclosure may be implemented together with virtually any type of computer, regardless of the platform being suitable for storing and/or executing program code. FIG. 5 shows, as an example, a computing system 500 suitable for executing program code related to the methods disclosed herein.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the event component 110, the value component 120, the threshold component 130, the interface component 140, and the location component 150. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A method for automatically changing a time zone of a mobile device to a current time zone, comprising:
    detecting a first event for the mobile device from a plurality of events, the plurality of events representing a possible time zone change from a first time zone;
    generating a time change value based on detection of the first event;
    detecting a subsequent event for the mobile device, the subsequent event being an event of the plurality of events;
    modifying the time change value based on detection of the subsequent event;
    determining the time change value exceeds a change threshold value; and
    changing a time zone display of the mobile device from the first time zone to a second time zone based on at least one detected event for the mobile device.

2. The method of claim 1, wherein the first event and the subsequent event occur in the first time zone, the method further comprising:
    detecting a first location and a first time for the first event, the time change value being generated based on the first event, the first location, and the first time;
    detecting a subsequent location and a subsequent time for the subsequent event, the time change value being modified based on the subsequent event, the subsequent location, and the subsequent time; and
    determining the first location and the subsequent location are proximate to a landmark associated with at least one event of the plurality of events.

3. The method of claim 1, further comprising:
    determining an elapsed time between the first event and the subsequent event; and
    modifying the time change value based on the elapsed time.

4. The method of claim 1, further comprising:
    displaying the first time zone within an event window of a user interface displayed on the mobile device; and
    based on the time change value exceeding the change threshold value, displaying the second time zone within the event window of the user interface displayed on the mobile device, the second time zone being displayed proximate to the first time zone.

5. The method of claim 4, wherein the subsequent event is a plurality of subsequent events, the method further comprising:
    detecting each subsequent event of the plurality of subsequent events at a distinct time;
    modifying the time change value based on detection of each subsequent event of the plurality of subsequent events; and
    based on detection of each subsequent event and modification of the time change value, iteratively modifying a depiction of the first time zone and the second time zone within the event window.

6. The method of claim 1, further comprising:
    determining at least one event of the first event and the subsequent event is a departure from the first time zone; and
    displaying the first time zone and a departure countdown representing a remaining time until departure from the first time zone.

7. The method of claim 1, wherein changing the time zone display of the mobile device further comprises:
    determining an arrival countdown representing a time remaining until arrival at a location within the second time zone; and
    displaying the arrival countdown within the time zone display of the mobile device.

8. A system for automatically changing a time zone of a mobile device to a current time zone, comprising:
    one or more processors; and
    a computer-readable storage medium, coupled to the one or more processors, storing program instructions that, when executed by the one or more processors, cause the one or more processors to perform operations comprising:
        detecting a first event for the mobile device from a plurality of events, the plurality of events representing a possible time zone change from a first time zone;
        generating a time change value based on detection of the first event;
        detecting a subsequent event for the mobile device, the subsequent event being an event of the plurality of events;
        modifying the time change value based on detection of the subsequent event;
        determining the time change value exceeds a change threshold value; and
        changing a time zone display of the mobile device from the first time zone to a second time zone based on at least one detected event for the mobile device.

9. The system of claim 8, wherein the first event and the subsequent event occur in the first time zone, the operations further comprise:
    detecting a first location and a first time for the first event, the time change value being generated based on the first event, the first location, and the first time;
    detecting a subsequent location and a subsequent time for the subsequent event, the time change value being modified based on the subsequent event, the subsequent location, and the subsequent time; and
    determining the first location and the subsequent location are proximate to a landmark associated with at least one event of the plurality of events.

10. The system of claim 8, wherein the operations further comprise:
    determining an elapsed time between the first event and the subsequent event; and
    modifying the time change value based on the elapsed time.

11. The system of claim 8, wherein the operations further comprise:
    displaying the first time zone within an event window of a user interface displayed on the mobile device; and
    based on the time change value exceeding the change threshold value, displaying the second time zone within the event window of the user interface displayed on the mobile device, the second time zone being displayed proximate to the first time zone.

12. The system of claim 11, wherein the subsequent event is a plurality of subsequent events, the operations further comprise:
    detecting each subsequent event of the plurality of subsequent events at a distinct time;
    modifying the time change value based on detection of each subsequent event of the plurality of subsequent events; and
    based on detection of each subsequent event and modification of the time change value, iteratively modifying a depiction of the first time zone and the second time zone within the event window.

13. The system of claim 8, wherein the operations further comprise:
    determining at least one event of the first event and the subsequent event is a departure from the first time zone; and
    displaying the first time zone and a departure countdown representing a remaining time until departure from the first time zone.

14. The system of claim 8, wherein changing the time zone display of the mobile device further comprises:
    determining an arrival countdown representing a time remaining until arrival at a location within the second time zone; and
    displaying the arrival countdown within the time zone display of the mobile device.

15. A computer program product for automatically changing a time zone of a mobile device to a current time zone, the computer program product comprising a computer readable storage medium having program instructions embodied therewith, the program instructions being executable by one or more processors to cause the one or more processors to perform operations comprising:
    detecting a first event for the mobile device from a plurality of events, the plurality of events representing a possible time zone change from a first time zone;
    generating a time change value based on detection of the first event;
    detecting a subsequent event for the mobile device, the subsequent event being an event of the plurality of events;
    modifying the time change value based on detection of the subsequent event;
    determining the time change value exceeds a change threshold value; and
    changing a time zone display of the mobile device from the first time zone to a second time zone based on at least one detected event for the mobile device.

16. The computer program product of claim 15, wherein the first event and the subsequent event occur in the first time zone, the operations further comprise:
    detecting a first location and a first time for the first event, the time change value being generated based on the first event, the first location, and the first time;
    detecting a subsequent location and a subsequent time for the subsequent event, the time change value being modified based on the subsequent event, the subsequent location, and the subsequent time; and
    determining the first location and the subsequent location are proximate to a landmark associated with at least one event of the plurality of events.

17. The computer program product of claim 15, wherein the operations further comprise:
    displaying the first time zone within an event window of a user interface displayed on the mobile device; and
    based on the time change value exceeding the change threshold value, displaying the second time zone within the event window of the user interface displayed on the mobile device, the second time zone being displayed proximate to the first time zone.

18. The computer program product of claim 17, wherein the subsequent event is a plurality of subsequent events, the operations further comprise:
    detecting each subsequent event of the plurality of subsequent events at a distinct time;
    modifying the time change value based on detection of each subsequent event of the plurality of subsequent events; and
    based on detection of each subsequent event and modification of the time change value, iteratively modifying a depiction of the first time zone and the second time zone within the event window.

19. The computer program product of claim 15, wherein the operations further comprise:
    determining at least one event of the first event and the subsequent event is a departure from the first time zone; and
    displaying the first time zone and a departure countdown representing a remaining time until departure from the first time zone.

20. The computer program product of claim 15, wherein changing the time zone display of the mobile device further comprises:
    determining an arrival countdown representing a time remaining until arrival at a location within the second time zone; and
    displaying the arrival countdown within the time zone display of the mobile device.

\* \* \* \* \*